United States Patent
Diab et al.

(10) Patent No.: US 8,462,813 B2
(45) Date of Patent: *Jun. 11, 2013

(54) METHOD AND SYSTEM FOR ASYMMETRIC OPERATION IN A NETWORK NODE IN AN ENERGY EFFICIENT NETWORK

(75) Inventors: Wael William Diab, San Francisco, CA (US); Kevin Clyde Brown, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,763

(22) Filed: May 15, 2012

(65) Prior Publication Data
US 2012/0224582 A1 Sep. 6, 2012

Related U.S. Application Data

(63) Continuation of application No. 12/235,368, filed on Sep. 22, 2008, now Pat. No. 8,199,770.

(60) Provisional application No. 61/014,195, filed on Dec. 17, 2007, provisional application No. 61/094,626, filed on Sep. 5, 2008.

(51) Int. Cl.
*H04J 3/16* (2006.01)
(52) U.S. Cl.
USPC .......................................... 370/468
(58) Field of Classification Search
None
See application file for complete search history.

(56) References Cited

U.S. PATENT DOCUMENTS

| | | | |
|---|---|---|---|
| 6,732,190 B1 | 5/2004 | Williams et al. | |
| 6,795,450 B1 | 9/2004 | Mills et al. | |
| 7,350,130 B2 | 3/2008 | Tran et al. | |
| 2003/0191854 A1 | 10/2003 | Hsu et al. | |
| 2004/0117674 A1 | 6/2004 | Gutman et al. | |
| 2005/0039103 A1* | 2/2005 | Azenko et al. | 714/776 |
| 2006/0034295 A1 | 2/2006 | Cherukuri et al. | |
| 2006/0117089 A1 | 6/2006 | Karam | |
| 2007/0008898 A1 | 1/2007 | Sharma et al. | |
| 2007/0032256 A1* | 2/2007 | Kolze | 455/522 |
| 2007/0127581 A1 | 6/2007 | Connor et al. | |
| 2007/0280239 A1 | 12/2007 | Lund | |
| 2008/0056284 A1 | 3/2008 | Powell et al. | |
| 2009/0125735 A1 | 5/2009 | Zimmerman | |

* cited by examiner

*Primary Examiner* — Marcus R Smith
(74) *Attorney, Agent, or Firm* — Duane S. Kobayashi

(57) ABSTRACT

An Ethernet network comprising multi-rate link partners that may be operable to communicate symmetrically and/or asymmetrically via any of a plurality of channels. The multi-rate link partners may monitor one or more factors that may affect their power consumption and/or energy efficiency. During operation, an uplink and/or downlink communication rate may be configured, based on the monitoring, to enable asymmetrical data rate operation. The monitored factors may comprise prior or current data rates, bit error rate, packet error rate, latency, queued data and/or tasks, for example. The multi-rate link partners may comprise a twisted pair PHY, an optical PHY or a backplane PHY. In order to reduce power consumption and/or improve energy efficiency, one or more of the uplink communication rate and/or the downlink communication rate may be lowered. The power consumption may be reduced for a multi-rate PHY, a host computer and/or a MAC controller.

20 Claims, 6 Drawing Sheets

METHOD AND SYSTEM FOR ASYMMETRIC OPERATION IN A NETWORK NODE IN AN ENERGY EFFICIENT NETWORK

CROSS-REFERENCE TO RELATED APPLICATIONS/INCORPORATION BY REFERENCE

This application is a continuation of U.S. patent application Ser. No. 12/235,368, filed on Sep. 22, 2008.

Patent application Ser. No. 12/235,368 claims priority to, and claims the benefit of U.S. Provisional Application Ser. No. 61/014,195 filed on Dec. 17, 2007.

Patent application Ser. No. 12/235,368 also claims priority to, and claims the benefit of U.S. Provisional Application Ser. No. 61/094,626 filed on Sep. 5, 2008.

This patent application also makes reference to:
U.S. patent application Ser. No. 12/235,345 filed on Sep. 22, 2008;
U.S. patent application Ser. No. 12/235,391 filed on Sep. 22, 2008;
U.S. patent application Ser. No. 12/235,410 filed on Sep. 22, 2008; and
U.S. patent application Ser. No. 12/235,506 filed on Sep. 22, 2008.

Each of the above stated applications is hereby incorporated herein by reference in its entirety.

FIELD OF THE INVENTION

Certain embodiments of the invention relate to networking. More specifically, certain embodiments of the invention relate to a method and system for asymmetric operation in a network node in an energy efficient Ethernet network.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often result in significant increases in power consumption.

New transmission technologies enable higher transmission rates over a plurality of infrastructures such as copper cabling, optical fiber and backplane connectivity, for example, KR and KX4 copper backplane physical media. Various efforts exist in this regard, including technologies that enable transmission rates that may even reach 100 Gigabit-per-second (Gbps) data rates over existing cabling.

Further limitations and disadvantages of conventional and traditional approaches will become apparent to one of skill in the art, through comparison of such systems with the present invention as set forth in the remainder of the present application with reference to the drawings.

DETAILED DESCRIPTION OF THE INVENTION

Certain embodiments of the invention may be found in a method and system for asymmetric operation in a network node in an energy efficient Ethernet network. Exemplary aspects of the invention, the Ethernet network may comprise network nodes that may be, for example, multi-rate link partners coupled via an Ethernet link. The Ethernet link may comprise one or more channels over which the multi-rate link partners may communicate. The multi-rate link partners may be operable to communicate over any of the channels via symmetric and/or asymmetric data rates. In addition, the multi-rate link partners may be operable to monitor one or more factors that may affect their power consumption and/or energy efficiency. The monitored factors may comprise, for example, prior or current data rates, bit error rate (BER), packet error rate (PER) and/or latency. In addition, one or more factors that may affect power consumption and/or energy efficiency may comprise one or more of data load, queue depths, queue change rates, tasks assigned bus operations and/or OSI layer two and above control policy. Based on the monitoring, an uplink communication rate and/or a downlink communication rate may be configured for asymmetrical operation via any of the plurality of channels.

In accordance with an embodiment of the invention, the multi-rate link partners may comprise, for example, a twisted pair PHY, an optical PHY or a backplane PHY. In order to, for example, reduce power consumption and/or improve energy efficiency, one or more of the uplink communication rate and/or the downlink communication rate may be lowered. The communication rate may be transitioned to a lower or higher data rate at, for example, designated byte boundaries and/or at LDPC frame boundaries. In this manner, the power consumption may be reduced within one or both link partners for one or more of a multi-rate PHY, a host computer and/or a MAC controller.

In some embodiments of the invention, the multi-rate link partners may comprise a multimedia system wherein high bandwidth multimedia data may be transmitted in a first direction at a first data rate, for example, from an uplink multimedia server to a downlink client. Corresponding low bandwidth control information may be transmitted in a second direction at a second data rate from the downlink client to the uplink multimedia server. Data rate in one direction may drop to zero while data rate in the opposite direction may be at a full rate or an intermediate rate for example. In addition to reducing power consumption, various embodiments of the invention may, for example, provide reduced crosstalk and/or EMI and improvements in bit error rate and/or latency.

Figure 1:
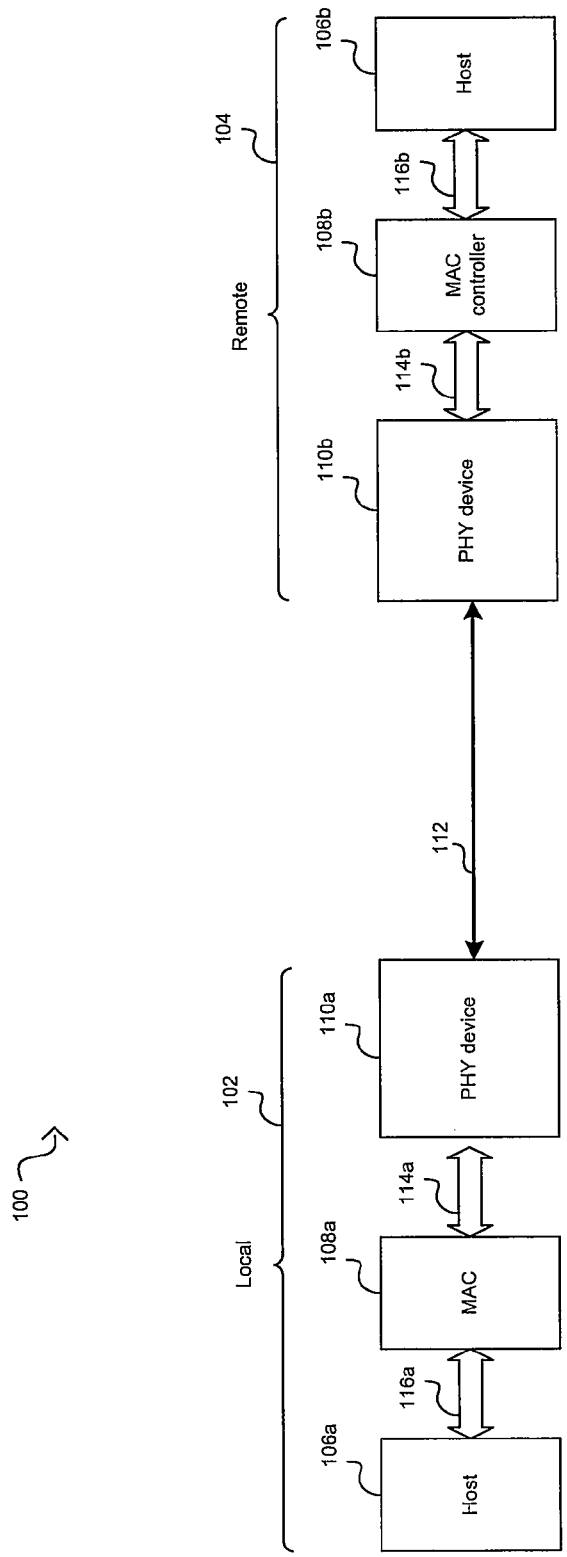
FIG. 1 is a block diagram illustrating an Ethernet connection between a local link partner and a remote link partner, in accordance with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. Throughout this document, the cable 112 may also be referred to as the Ethernet link 112, for example. In an exemplary embodiment of the invention, the cable 112 may comprise up to four or more channels, each of which may, for example, comprise an unshielded twisted pair (UTP). The local link partner 102 and the remote link partner 104 may communicate via two or more channels comprising the cable 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP.

In an exemplary embodiment of the invention, the link partners 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates such as 10 Gbps (10GBASE-KX4 and/or 10GBASE-KR); potentially standardized rates such as 40 Gbps and 100 Gbps and/or non-standard rates such as 2.5 Gbps and 5 Gbps such as 40 Gbps and 100 Gbps; and/or non-standard rates such as 2.5 Gbps and 5 Gbps that may be utilized as intermediate or sub rates for a 10 Gbps PHY for example.

In an exemplary embodiment of the invention, the link partners 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The local link partner 102 may comprise a host 106a, a medium access control (MAC) controller 108a, and a PHY device 110a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (NV) enabled equipment. In this regard, the A/V enabled equipment may, for example, comprise, a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

In various embodiments of the invention, the remote link partner 104 may be an uplink partner, for example a media server, a data center server or top of rack switch that may transmit data to the local link partner 102. In this manner, the local link partner 102 may be a downlink link partner, for example, a personal computer (PC), television or set-top-box. The uplink remote partner 104 may transmit high data rate traffic such as video and/or audio data whereas the downlink local partner 102 may transmit low rate signaling traffic. Accordingly, data rates between the uplink remote partner 104 and downlink local partner 102 may be asymmetrical.

The PHY devices 110a and 110b may each comprise suitable logic, circuitry, and/or code that may enable communication, for example, transmission and/or reception of data, between the local link partner 102 and the remote link partner 104. The PHY devices 110a and 110b may support, for example, Ethernet operations. The PHY devices 110a and 110b may enable communications, such as 10 Mbps, 100 Mbps, 1000 Mbps (or 1 Gbps), 2.5 Gbps, 4 Gbps, 5 Gbps, 10 Gbps or 40 Gbps or 100 Gbps for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support exchange and negotiation of speed capabilities for identifying and selecting communication parameters such as speed and duplex mode.

In various embodiments of the invention, the PHY devices 110a and 110b may comprise suitable logic, circuitry, and/or code that may enable asymmetric data rates that may support energy Efficient Ethernet. The PHY devices 110a and/or 110b may enable transmission and/or reception at a high(er) data rate in one direction and transmission and/or reception at a low(er) data rate in the other direction. In one exemplary embodiment of the invention, the remote link partner 104 may comprise a multimedia server and the local link partner 102 may comprise a multimedia client. In this regard, the remote link partner 104 may transmit multimedia data, for example, to the local link partner 102 at high(er) data rates while the local link partner 102 may transmit control or auxiliary data associated with the multimedia content at low(er) data rates. Other exemplary embodiments of the invention may comprise switches, aggregation switches and routers.

A change in rate such as stepping up in rate or stepping down in rate may occur asymmetrically among the PHY devices 110a and/or 110b. For example, a data rate for traffic in one direction corresponding to a transmitter on the PHY device 110a and a receiver on the PHY device 110b may step down while the data rate in the opposite direction on the same channel may be reduced or it may remain the same. Moreover, in some embodiments of the invention, one or more of the PHY devices may step down to a rate of zero. For example, a data rate in one direction may be zero while a data rate in the opposite direction may be a full rate or an intermediate rate.

In various embodiments of the invention, for a data rate transition, a link partner, for example, the link partner 102, may utilize a byte of an Ethernet frame on which to transition a rate. In this regard, the link partner 102 may transition the rate just after transmitting the designated byte and the link partner 104 may transition just after receiving the designated byte. In this manner, data rate transitions on a link may occur in mid-frame. This technique may be very useful on serial type interfaces like a 10GBASE-KR or any of the optical interfaces. Additionally, in accordance with an embodiment of the invention, the data rate may transition on an LDPC frame boundary. This may be useful for systems such as a 10GBASE-T PHY that splits an Ethernet packet into LDPC frames or any other PHY that splits packets into frames.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE symbols that may be communicated between frames of data, during inter frame gap (IFG)).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as physical layer transmitters and/or receivers, or physical layer transceivers, PHY transceivers, PHYceivers, or PHY, for example. The hosts 106a and 106b may comprise suitable logic, circuitry, and/or code that may enable operability and/or functionality of the upper OSI layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation may be required. Data packets received by the PHY devices 110a and 110b from MAC controllers 108a and 108b, respectively, may comprise data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multirate interfaces and/or media independent interfaces (MII).

The bus controller interfaces 116a and 116b may correspond to PCI or PCI-X interfaces. Notwithstanding, the invention is not limited in this regard.

In operation, the PHY devices 110a and 110b may operate within, for example, a 1 Gbps or 10 Gbps network. Conventionally, the PHY devices 110a and 110b may transmit data in a symmetric manor such that a data rate in one direction may be the same as a data rate in an opposite direction, regardless of the level of offered traffic in each direction. However, there may be instances when traffic may be greater in one direction and operating with symmetric data rates may be inefficient. In various embodiments of the invention, the local link partner 102 and/or the remote link partner 104 may be enabled negotiate and/or coordinate different rates for different directions of traffic flow via the Ethernet link 112. In this regard, based on various factors that may, for example, power consumption and/or energy efficiency, the local partner 102 may be configured to transmit data to a remote partner 104 at a first data rate over one or more channels, while the remote partner 104 may transmit data to the local partner 102 at a second data rate over one or more other channels. The PHY devices 110a and/or 110b, MAC devices 108a and 108b and/or the hosts 106a and/or 106b may be enabled to consume less energy and/or utilize fewer resources as a result of lower transmission and/or reception rates.

In an exemplary embodiment of the invention, asymmetric traffic over an Ethernet link may comprise multimedia data that may be downloaded from a multimedia server, for example, remote link partner 104 to a set-top-box, For example, local link partner 102. In this manner, the multimedia traffic from remote link partner 104 to the local link partner 102 may be transmitted at a higher data rate than, for example, signaling and/or control information transmitted from the local link partner 102 to the remote link partner 104. In this manner, the remote link partner 104 may be an uplink partner and the local link partner 102 may be a downlink partner.

Figure 2:
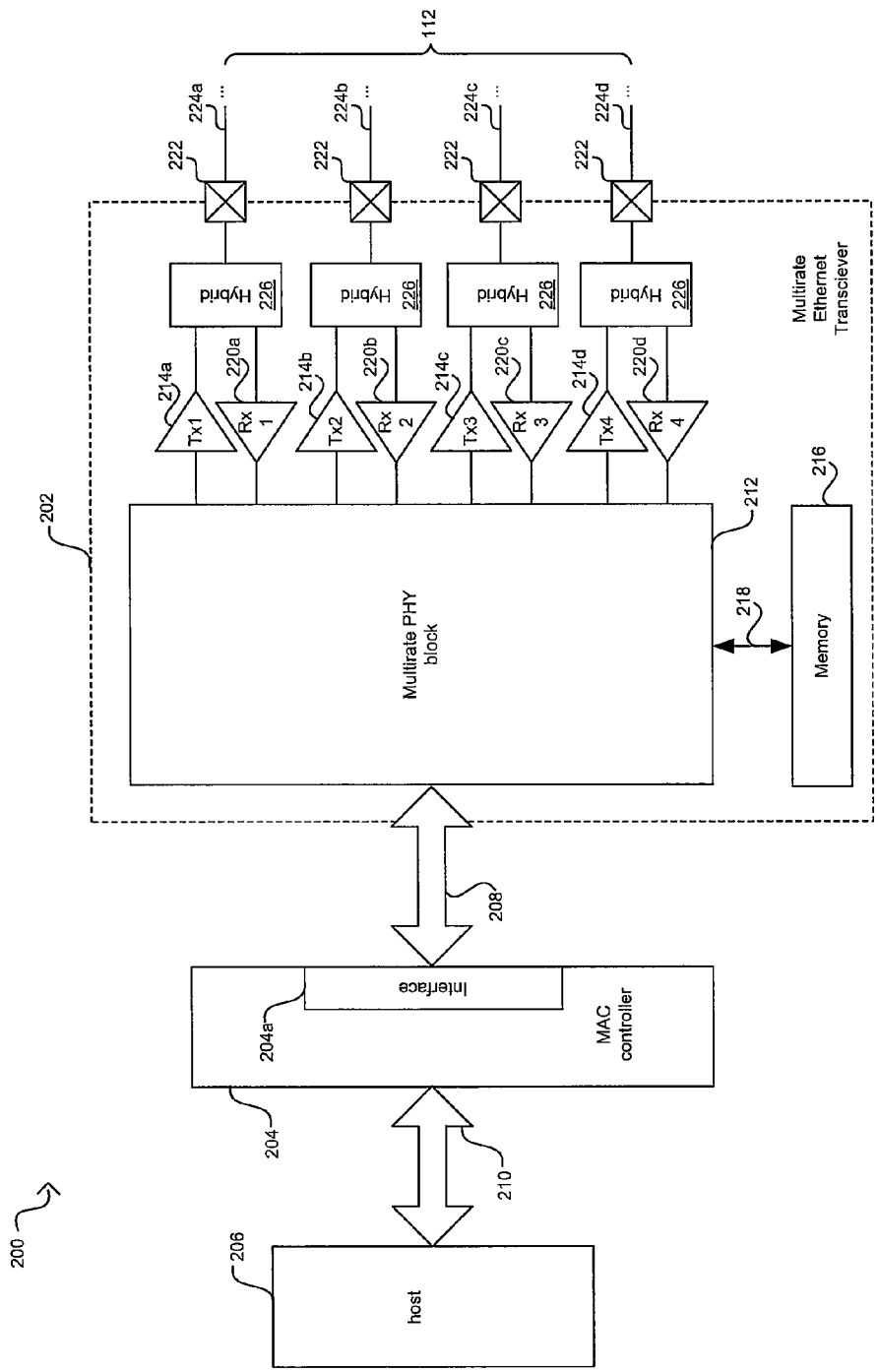
FIG. 2 is a block diagram illustrating an exemplary Ethernet over twisted pair PHY device architecture comprising a multi-rate physical block, in accordance with an embodiment of the invention.

FIG. 2 is a block diagram illustrating an exemplary Ethernet over twisted pair PHY device architecture, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a multirate physical layer block 212, one or more transmitters 214, one or more receivers 220, a memory 216, a memory interface 218, one or more input/output interfaces 222 and the channels 224.

The PHY device 202 may be an integrated device that may comprise a multi-rate physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise an interface 204a that may comprise suitable logic, circuitry, and/or code to enable communication with the PHY device 202 via the interface 208.

The multi-rate physical layer block 212 in the PHY device 202 may comprise suitable logic, circuitry, and/or code that may enable operability and/or functionality of physical layer requirements. In this regard, the multi-rate physical layer block 212 may enable generating the appropriate link discovery signaling utilized for establishing communication with a remote PHY device in a remote link partner. The multi-rate physical layer block 212 may communicate with the MAC controller 204 via the interface 208. In one aspect of the invention, the interface 208 may be a media independent interface (MII) and may be configured to utilize a plurality of serial data lanes for receiving data from the multi-rate physical layer block 212 and/or for transmitting data to the multi-rate physical layer block 212. The multi-rate physical layer block 212 may be configured to operate in one or more of a plurality of communication modes, where each communication mode may implement a different communication protocol. These communication modes may comprise, for example, Ethernet over twisted pair standards 10BASE-T, 100BASE-TX, 1000BASE-T, 10GBASE-T, and other similar protocols that utilize multiple channels between link partners. The multi-rate physical layer block 212 may be configured to operate in a particular mode of operation upon initialization or during operation. For example, a rate (such as 10 Mbps, 100 Mbps, 1000 Mbps, or 10 Gbps) and/or mode (duplex or simplex) for transmitting information may be negotiated between link partners. For example, a physical layer protocol such as out-of-band channels, Q-ordered sets or a preamble may be utilized or a frame based protocol such as LLDP may be utilized to determine a rate or mode.

The multi-rate physical layer block 212 may be coupled to memory 216 through the memory interface 218, which may be implemented as, for example, a serial interface or a bus. Notwithstanding, the memory 216 may comprise suitable logic, circuitry, and/or code that may enable storage or programming of information that includes parameters and/or code that may effectuate the operation of the multi-rate physical layer block 212. The parameters may comprise configuration data and the code may comprise operational code such as software and/or firmware, but the information need not be limited in this regard. Moreover, the parameters may include adaptive filter and/or block coefficients for use by the multi-rate physical layer block 212, for example Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a channel that may comprise the cable 112. In this manner, a transmitter/receiver pair may interface with each of the channels 224a, 224b, 224c, 224d. Conventionally, transmitter receiver pairs such as 214a and 220a, 214b and 220b, 214c and 220c and/or 214d and 214d may each transmit and receive data at the same data rate. For example, at data rates such as 100 Mbps, 1 Gbps, 10 Gbps. In various embodiments of the invention, a transmitter and receiver within one or more pairs may be enabled to operate at different communication rates over one or more channels based, for example, on energy efficiency, power consumption, link utilization, current load, expected or predicted load, and/or other factors.

The input/output interfaces 222 may comprise suitable logic circuitry, and/or code that may enable the PHY device 202 to impress signal information onto a physical medium comprising a channel, for example a twisted pair channel comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium comprising the channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the link partner 200 may be configured to transmit and/or receive traffic at different data rates. In this regard, the PHY device 202 may coordinate and/or negotiate with a remote link partner to transmit data at a first data rate and receive data at a second data rate. Transmission and/or reception data rates may be increased or decrease according to one or more factors that affect power consumption and/or energy efficiency. For example, link statistics such as link utilization, bit error rate (BER) and/or packet error rate (PER) may indicate that a data rate may be increased or decreased. In addition, system workload, subsystem functions such as bus utilization, queue depths and/or rate of change of queues in a switch may be monitored for example. In this regard, data rates for data travelling in one direction may be lowered to a level that may enable a more efficient use of energy. For example, link partner 200s transmission data rate may be lowered to zero while its reception rate may be at full rate or an intermediate/sub-rate. Moreover, various functions and/or components of the link partner 200 and/or channels 224 may be simplified, shared or eliminated as a result of reduced data rates.

In an exemplary embodiment of the invention, a multimedia server may comprise the link partner 200 that may transmit multimedia traffic at a first higher data rate to a client and/or may receive control and/or signaling traffic at a second lower data rate from the client. In this manner, portions of the multi-rate PHY block, the transmitters 214, the receivers 220, the hybrids 226, and/or the interfaces 222 may be powered down (or placed in a low(er) power state). Accordingly, power consumption may be reduced in the host 206 and/or MAC controller 204 based on reduced data rates.

Figure 3A:
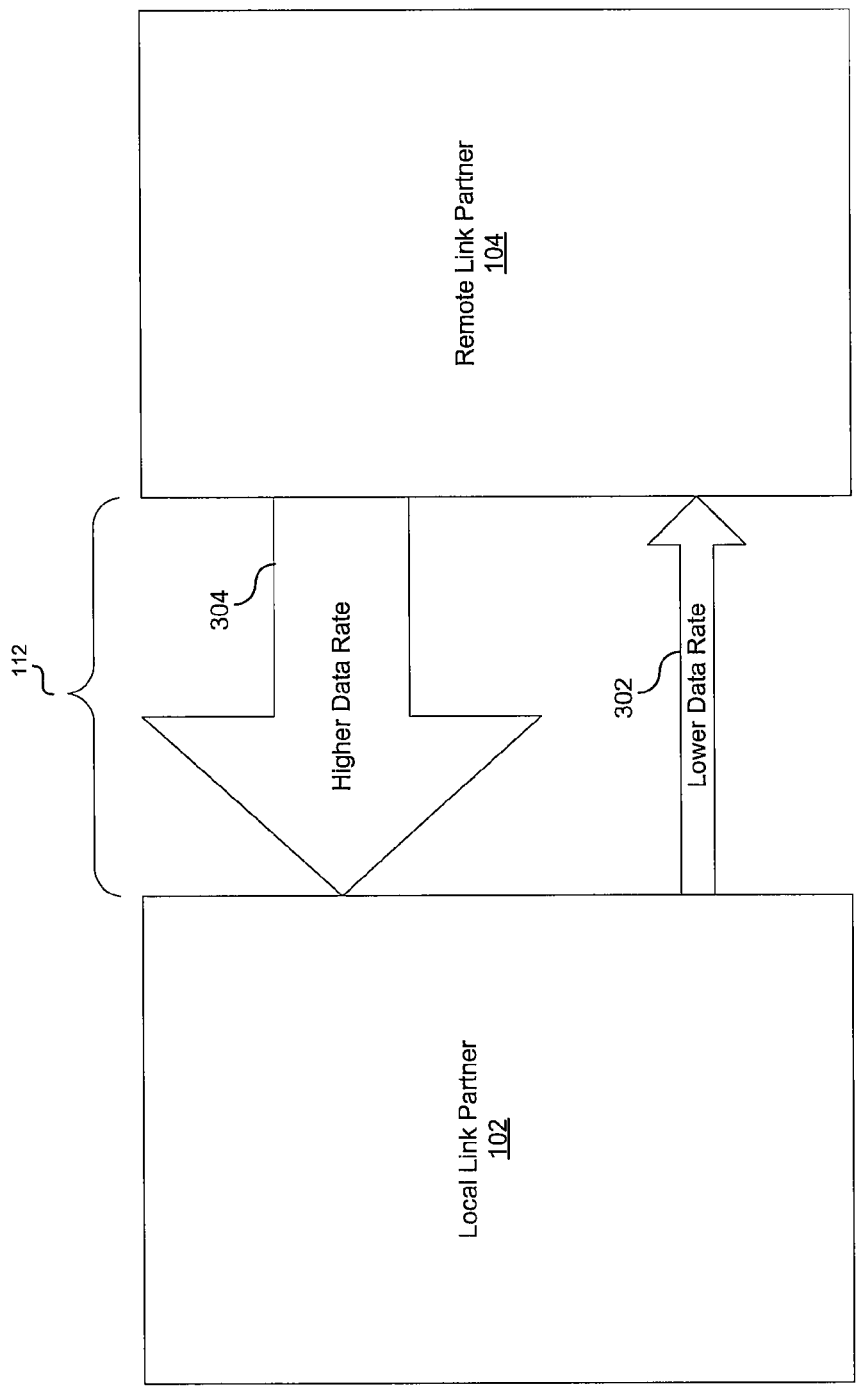
FIG. 3A is a block diagram illustrating asymmetric data rates enabling reduced power consumption and improved energy efficiency, in accordance with an embodiment of the invention.

FIG. 3A is a block diagram illustrating asymmetric data rates enabling reduced power consumption and improved energy efficiency, in accordance with an embodiment of the invention. Referring to FIG. 3A there is shown the link partners 102 and 104 as described with respect to FIG. 1, with the data rates between the link partners 102 and 104 represented by arrows 302 and 304. The size of the arrow represents a relative data rate for data traveling in the direction corresponding to the arrow. Thus, in the exemplary embodiment of the invention, a first data rate 302 from the link partner 102 to the link partner 104 may be lower than a second data rate 304 from the link partner 104 to the link partner 102. For example, the link partner 104 may be a video server or data server. For various time instants the data rate 304 may be, for example, at 90% of full rate while the data rate 302 in the opposite direction may be only at 10% of full rate.

Figure 3B:
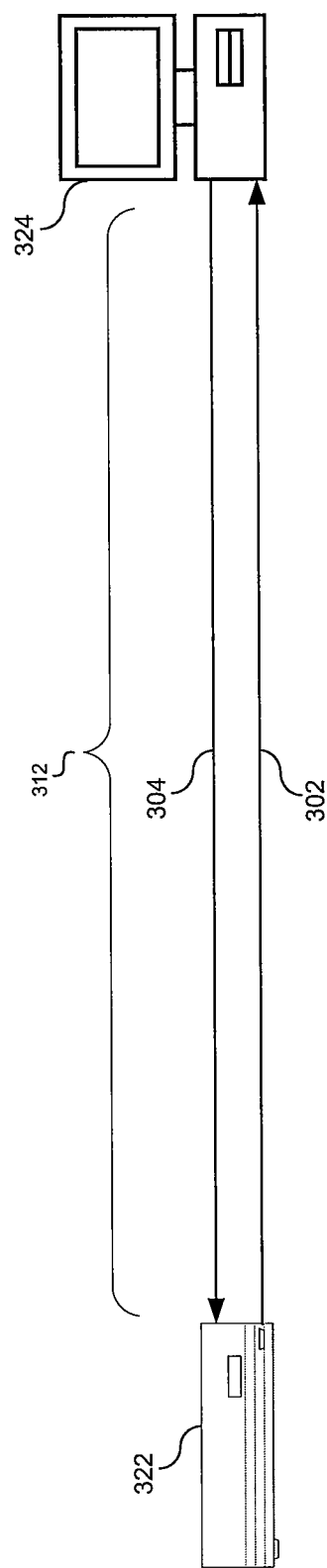
FIG. 3B is a block diagram of an exemplary system that may utilize asymmetric data rates to reduce power consumption, in accordance with an embodiment of the invention.

FIG. 3B is a block diagram of an exemplary system that may utilize asymmetric data rates to reduce power consumption, in accordance with an embodiment of the invention. Referring to FIG. 3B, there is shown an Ethernet switch 322, a file server 324, and Ethernet link 312, the data rate 302 and the data rate 304.

The Ethernet switch 322 and file server 324 may comprise Ethernet link partners that are similar to or substantially the same as the link partners 102 and 104 respectively. In addition, the Ethernet link 312 may be similar and/or substantially the same as the Ethernet link 112. The data rate 302 and data rate 304 are described with respect to FIG. 3A.

The Ethernet switch 322 and file server 324 may be enabled to exchange data with asymmetric data rates. For example, the file server 324 may download large multi-media files, requiring a high bandwidth via the Ethernet switch 322. The Ethernet switch 322 may transmit control and/or auxiliary data associated with the multimedia content at a low(er) data rate 302 to the file server 324.

In operation, aspects of the invention may enable negotiation between the link partners 322 and/or 324 to determine the rates 302 and/or 304. The link partners 322 and/or 324 may assess factors that may affect power consumption such as an amount of data stored within buffers waiting for transmission for example. The link partners 322 and/or 324 may agree upon stepping up or stepping down a data rate in one or more directions prior to and/or during transmission. For example, based on an agreed upon one or more determined rates, the link partner 322 may be configured to transmit at data rate 302 and receive at a data rate 304 while the link partner 324 may be configured to transmit at data rate 304 and receive at data rate 302. In this regard, the link partner 322 may be a downlink partner and the link partner 324 may be an uplink partner.

In this manner, energy efficiency may be improved within the link partners 322 and/or 324 as compared with link partners that utilize symmetric data rates. For example, the link partner 322 may comprise elements such as the host 106a, the medium access control (MAC) controller 108a, and the PHY device 110a shown in FIG. 1. Various components and/or functions within these elements may be set to a low(er) power state; they may be shared and/or may be eliminated when lower data rates are utilized. Accordingly, significant power savings may be achieved within link partners 322 and/or 324 in addition to power savings on the Ethernet link 112.

Figure 4:
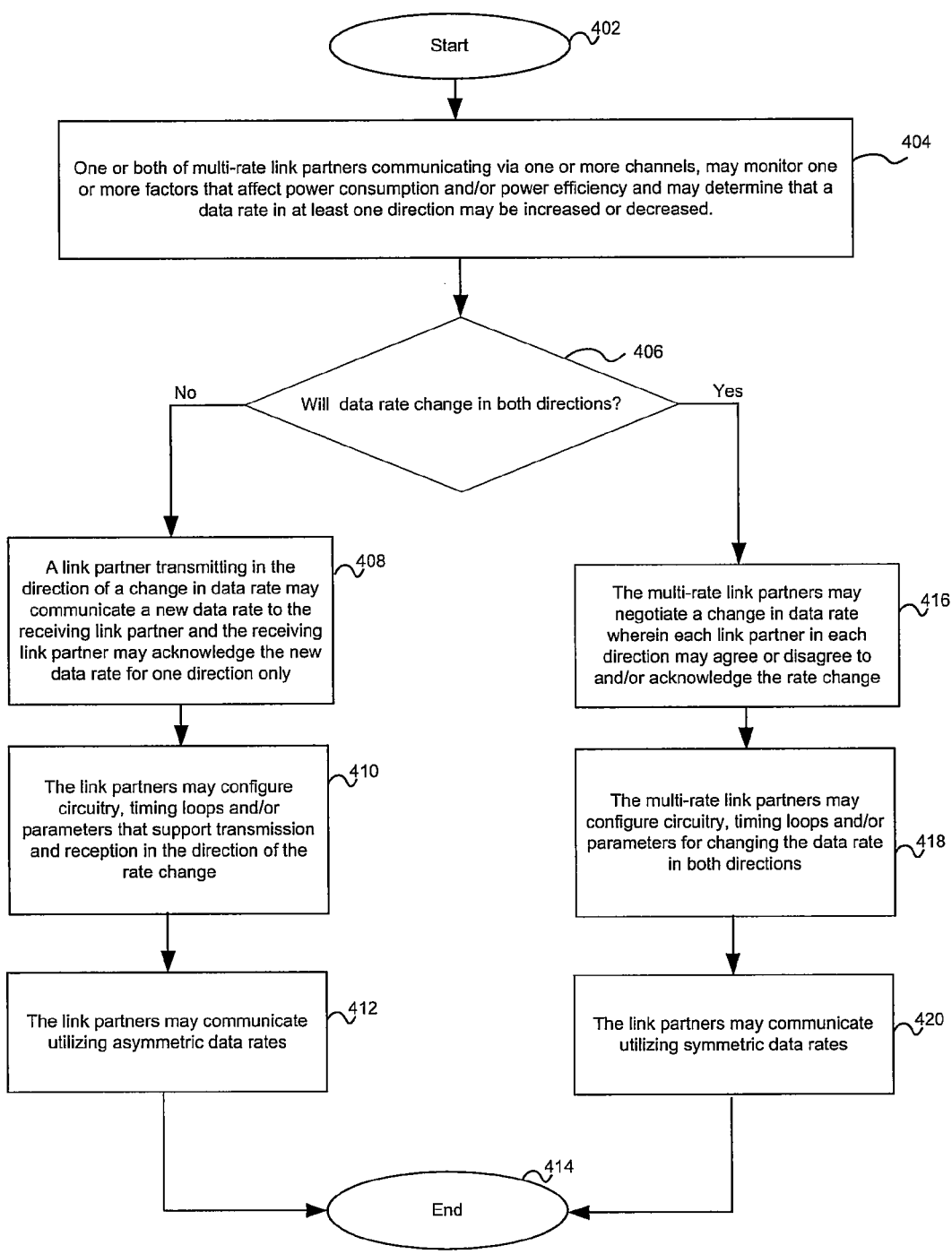
FIG. 4 is a flow chart illustrating exemplary steps for communicating between link partners via one or more channels utilizing asymmetric data rates, in accordance with an embodiment of the invention.

FIG. 4 is a flow chart illustrating exemplary steps for communicating between link partners via one or more channels utilizing asymmetric data rates, in accordance with an embodiment of the invention. Referring to FIG. 4, after start step 402, in step 404, one or both of multi-rate link partners 102 and 104 communicating via one or more channels 224a, 224b, 224c and 224d, may monitor one or more factors that affect power consumption and/or energy efficiency and may determine that a data rate in at least one direction may be increased or decreased. In step 406, in instances when the data rate after the increase or decrease is different in each direction (asymmetrical), exemplary steps may proceed to step 408. In step 408, a link partner 102 transmitting in the direction of a data rate change may communicate at a new data rate to the receiving link partner 104 and the receiving link partner 104 may acknowledge the new data rate for one direction. In step 410, the link partners 102 and/or 104 may configure circuitry, timing loops and/or parameters that support transmission and reception in the direction of the rate change.

In step 412, the link partners 102 and 104 may communicate utilizing asymmetric data rates. Step 414 may be an end of exemplary steps. In step 406, in instances when the data rate after the increase or decrease is the same in both directions (symmetrical), exemplary steps may proceed to step 416. In step 416, the multi-rate link partners 102 and 104 may negotiate a change in data rate wherein each link partner 102 and 104 may, in each direction, agree or disagree to and/or acknowledge the rate change. In step 418, the multi-rate link partners 102 and 104 may configure circuitry, timing loops and/or parameters for changing the data rate in both directions. In step 420, the link partners 102 and 104 may communicate utilizing symmetric data rates. Step 414 may be the end of exemplary steps.

Figure 5:
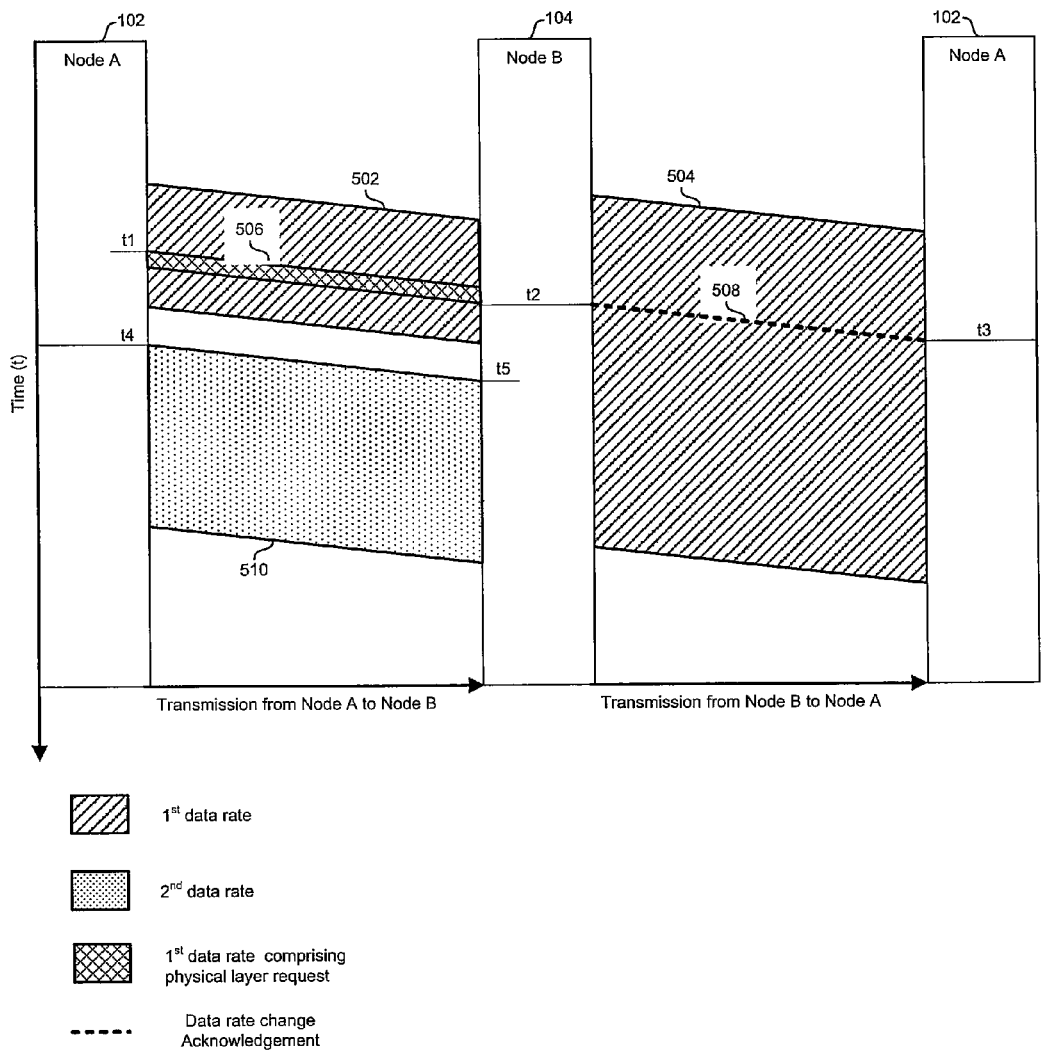
FIG. 5 is a data flow diagram illustrating an exemplary method for changing data rate in an asymmetric network configuration, in accordance with an embodiment of the invention.

FIG. 5 is a data flow diagram illustrating an exemplary method for changing data rate in an asymmetric network configuration, in accordance with an embodiment of the invention. Referring to FIG. 5 there is shown the link partners node A 102 (twice) and node B 104. Data traffic between node A 102 and node B 104 may be represented by the shaded areas 502, 504 and 510. Physical layer signaling traffic between node A 102 and node B 104 may be represented by the shaded area 506 and an acknowledgement signal (ACK) or negative acknowledgement signal (NACK) may be represented by broken line 508.

Prior to time instant t1, the node A 102 and node B 104 may be each transmitting at a first data rate. In this regard, the rate for data traffic 502 transmitted by the node A 102 and the data traffic 504 transmitted by the node B 104 may be the same, for example, a full rate. Prior to time instant t1, the node A 102 may determine to change its data rate, for example, to a half rate. At time instant t1, the node A 102 may begin transmitting physical layer signaling 506 which may comprise a request to lower the data rate from full rate to half rate for data traffic travelling in the direction from the node A 102 to the node B 104. In some exemplary embodiments of the invention, the request signal 506 may be transmitted via physical layer signaling together with packets of the data traffic 502. Packet based signaling generated by higher layer protocols may be utilized. Notwithstanding, physical layer signaling may enable a faster data rate transition.

After the data rate change request 506 arrives at the node B 104, the node B 104 may prepare for changing to its data rate in the direction which it is receiving data. Notwithstanding, the node B 104 may continue transmitting the data traffic 504 without disruption since it may not be changing data rate in the direction of its transmission. At time instant t2, the node B 104 may acknowledge (ACK) reception of the data rate change request 506 via physical layer signaling 508 sent together with packets for data traffic 504. In this regard, the ACK 508 may be communicated, for example, via a distinct idle symbol, without interrupting transmission 504. The node B 104 may begin to prepare its receiving circuitry, parameters and/or timing loops for reception of data traffic at the half rate. At time instant t3, the ACK 506 may arrive at node A 102. Accordingly, at time instant t4, the node A 102 may begin transmission 510 at the half rate. Since the node B 104 may not change rate in the direction of its transmission, the node A 102 may begin transmitting data traffic 510 without a time delay. For example, the node A 102 may not have to wait for the node B 104 to complete its transmission of data traffic 504. Moreover, the node A may not have to wait for the node B to acknowledge the request for lowering the data rate or to prepare circuitry, parameters and/or timing loops for transmission at a half rate. In a symmetric data rate system, both link nodes 102 and 104 may need to be able to transmit at lower data rates before a more energy efficient, low(er) power operation may be achieved.

In various embodiments of the invention, an Ethernet network may comprise network nodes, for example, multi-rate link partners 102 and 104, coupled via an Ethernet link 112. The Ethernet link may comprise one or more channels such as 224a, 224b, 224c and 224d. In addition, the multi-rate link partners 102 and/or 104 may comprise components corresponding to the one or more channels 224a, 224b, 224c and 224d. In various embodiments of the invention, the multi-rate link partners 102 and 104 may be enabled to communicate in a first direction at a first data rate 302 and in a second direction at a second data rate 304 over one or more of the plurality of channels. Moreover, the multi-rate link partners 102 and/or 104 may determine the first data rate 302 and/or the second data rate 304 and may agree upon the determined data rates 302 and/or 304 based on negotiations. The multi-rate link partners 102 and/or 104 may be configured accordingly. In this regard, the configured multi-rate link partners 102 and/or 104 may communicate via the one or more channels 224a, 224b, 224c and 224d in an asymmetric manor according to the first and/or second determined data rates 302 and/or 304.

In various embodiments of the invention, the first and second data rates 302 and 304 may be the same or may be different. Additionally, the first and/or second data rates 302 and 304 may be modified before, during and/or after communication via the one or more channels 224a, 224b, 224c and 224d. In instances where the first data rate 302 and/or the second data rate 304 is low(er) on one or more channels 224a, 224b, 224c and 224d, power levels for one or more corresponding components may be low(er) and as such may derive significant power savings. The corresponding components may be located within multi-rate link partner 102 and/or 104 within elements such as a multi-rate physical interface (PHY) 202, a medium access controller (MAC) 204 and a host 206 as well as within the Ethernet link 112. In some embodiments of the invention, the multi-rate link partners 102 and 104 may comprise a multimedia system wherein high bandwidth multimedia data may be transmitted in a first direction at a first data rate 304 for example from a multimedia server to a client and corresponding low bandwidth control information may be transmitted in a second direction at a second data rate 302 from the client to the multimedia server.

In an embodiment of the invention, an Ethernet network 100 may comprise multi-rate link partners 102 and 104 that may be operable to communicate symmetrically and/or asymmetrically. In this regard, the multi-rate link partners 102 and 104 may communicate via any of a plurality of channels on a link that may couple the multi-rate link partners 102 and 104. In addition, the multi-rate link partners 102 and 104 may monitor one or more factors that may affect their power consumption and/or energy efficiency. During operation, an uplink communication rate 302 and/or a downlink communication rate 304 of the one or more multi-rate link partners 102 and/or 104, may be configured to enable asymmetrical data rate operation via any of the plurality of channels 224a, 224b, 224c and 224d based on the monitoring. The monitored factors may comprise, for example, prior or current data rates, bit error rate (BER), packet error rate (PER) and/or latency, for example. In accordance with an embodiment of the invention, the multi-rate link partners 102 and 104 may comprise, for example, a twisted pair PHY, an optical PHY or a backplane PHY. In order to reduce power consumption and/or improve energy efficiency, one or more of the uplink communication rate 302 and/or the downlink communication rate 304 may be lowered. The communication rates 302 and/or 304 may be transitioned to a lower or higher data rate at, for example, designated byte boundaries and/or at LDPC frame boundaries. In this manner, the power consumption may be reduced by the multi-rate PHY 110a and/or 110b, the host computer 106a and/or 106b and/or the MAC controller 108a and/or 108b.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for asymmetric operation in a network node in an energy efficient Ethernet network.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:

transmitting, in a first transmission direction from a first link partner to a second link partner, packets of data at a first data rate, said second link partner being coupled to said first link partner via a cable communication medium;

transmitting, in said first transmission direction from said first link partner to said second link partner, an asymmetric request to lower a data rate for use in said first transmission direction from said first link partner to said second link partner from said first data rate to a second data rate lower than said first data rate, wherein said asymmetric request is transmitted via one or both of physical layer signaling and packet based signaling generated by higher layer protocols, said asymmetric request being generated based on monitoring of one or more factors that relate to an efficiency of transmission in said first transmission direction; and after transmission of said asymmetric request, configuring said first link partner to communicate in said first transmission direction at said second data rate, while a second transmission direction from said second link partner to said first link partner continues to communicate at said first data rate.

2. The method according to claim 1, wherein said one or more factors include one or more of prior data rates, current data rates, bit error rate, packet error rate and latency.

3. The method according to claim 1, wherein said one or more factors include one or more of data load, queue depths, queue change rates, tasks assigned bus operations and layer two and above control policy.

4. The method according to claim 1, wherein said configuring comprises configuring one of a twisted pair physical layer device, optical physical layer device and backplane physical layer device.

5. The method according to claim 1, wherein said configuring comprises configuring a media access control device or a host device.

6. The method according to claim 1, wherein said second data rate is zero.

7. The method according to claim 1, wherein said configuring comprises reducing a data rate of one of a plurality of channels in said first transmission direction to zero.

8. The method according to claim 1, wherein said configuring comprises transitioning from said first data rate to said second data rate at a designated byte boundary or an LDPC frame boundary.

9. A system for energy efficient networking, the system comprising:
one or more circuits in a first link partner that is communicatively coupled to a second link partner via a cable communication medium, said one or more circuits operable to:
transmit, in a first transmission direction from said first link partner to said second link partner, packets of data at a first data rate, said second link partner being coupled to said first link partner via a cable communication medium;
transmit, in said first transmission direction from said first link partner to said second link partner, an asymmetric request to lower a data rate for use in said first transmission direction from said first link partner to said second link partner from said first data rate to a second data rate lower than said first data rate, wherein said asymmetric request is transmitted via one or both of physical layer signaling and packet based signaling generated by higher layer protocols, said asymmetric request being generated based on monitoring of one or more factors that relate to an efficiency of transmission in said first transmission direction; and
after transmission of said asymmetric request, configure said first link partner to communicate in said first transmission direction at said second data rate, while a second transmission direction from said second link partner to said first link partner continues to communicate at said first data rate.

10. The system according to claim 9, wherein said one or more factors include one or more of prior data rates, current data rates, bit error rate, packet error rate and latency.

11. The system according to claim 9, wherein said one or more factors include one or more of data load, queue depths, queue change rates, tasks assigned bus operations and layer two and above control policy.

12. The system according to claim 9, wherein said one or more circuits configure one of a twisted pair physical layer device, optical physical layer device and backplane physical layer device.

13. The system according to claim 9, wherein said one or more circuits configure a media access control device or a host device.

14. The system according to claim 9, wherein said second data rate is zero.

15. The system according to claim 9, wherein said one or more circuits reduce a data rate of one of a plurality of channels in said first transmission direction to zero.

16. The system according to claim 9, wherein said one or more circuits configure a transition from said first data rate to said second data rate at a designated byte boundary or an LDPC frame boundary.

17. A method, comprising:
transmitting, in a first transmission direction from a first link partner to a second link partner, packets of data at a first data rate, said second link partner being coupled to said first link partner via a cable communication medium;
monitoring one or more factors that affect an efficiency of transmission in said first transmission direction;
concurrently with said transmitting packets of data, transmitting from said first link partner to said second link partner, via physical layer signaling, a request to change a data rate from said first data rate to a second data rate in said first direction of transmission; and
configuring said first link partner for communication at said second data rate in said first direction of transmission, while a second transmission direction from said second link partner to said first link partner continues to communicate at said first data rate, said configuring enabling asymmetrical data rate operation between said first link partner and said second link partner over said cable communication medium.

18. The method of claim 17, wherein said configuring comprises configuring one of a twisted pair physical layer device, optical physical layer device and backplane physical layer device.

19. The method of claim 17, wherein said configuring comprises configuring a media access control device or a host device.

20. The method of claim 17, wherein said configuring comprises reducing a data rate of one of a plurality of channels in said first transmission direction to zero.

* * * * *